(12) United States Patent  (10) Patent No.: US 6,483,213 B1
Hsu                        (45) Date of Patent: Nov. 19, 2002

(54) MOTOR WITH BUILT-IN CONTROL CIRCUITS

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 0 days.

(21) Appl. No.: 09/694,498
(22) Filed: Oct. 24, 2000
(51) Int. Cl.⁷ ................................................ H02K 11/00
(52) U.S. Cl. ..................................... 310/68 R; 310/89
(58) Field of Search .......................... 310/89, 91, 67 R, 310/68 R, 71; 318/50, 799

(56) References Cited

U.S. PATENT DOCUMENTS 4,642,496 A * 2/1987 Kerviel et al. ............ 310/68 B
4,773,829 A * 9/1988 Vettori ...................... 310/68 R
4,988,905 A * 1/1991 Tolmie, Jr. ................ 310/68 B

* cited by examiner

Primary Examiner—Tran Nguyen
(74) Attorney, Agent, or Firm—Rosenberg, Klein & Lee

(57) ABSTRACT

A motor hiding with a driving control circuit is disclosed. The motor stator excited coil is installed with an excited coil connecting plate for being connected with the coil completely. Then, the input and output signal ends and the detecting control ends passes through the through holes of the rear motor cover of the motor insulatedly, and is conductive to the circuit board of the driving control circuit for signal transformation. A lower momentum rotor has a hollow cylinder. Two panels at two ends serve to cover the two ends of the cylinder. Centers of the panels are aligned so that the rotor spindle is tightly engaged in the holes and thus, the supporting of the rotor is enhanced and a weight of the rotor is reduced, and therefore, the rotary momentum of the motor rotor is reduced.

3 Claims, 8 Drawing Sheets

MOTOR WITH BUILT-IN CONTROL CIRCUITS

FIELD OF THE INVENTION

The present invention relates to a motor hiding with a driving control circuit for resolving the problem that the conventional motor and the driving control circuit are made separately and thus are inconveniently and the problem of the momentum of the motor rotor after being integrally formed so as to increase the stability and fastening of the rotor. Therefore, the driving control motor of the present invention is easily installed and operated by the user. Since the novelty of the structure of the present invention, the assembly work in manufacturing is easy and the operation of the motor is stable. The electricity of the driving control circuit can be retained without being interfered. The object of the present invention is to have a motor hiding with a driving control circuit with high assembly efficiency and stability, and lower momentum.

BACKGROUND OF THE INVENTION

In order to achieve a driving control motor, the stability of the rotor and the strength must be taken into consideration and the isolation of the driving control circuit and the electromagnetic wave of the motor excited coil. FIG. 1 shows a prior art motor hiding with a driving control circuit. The prior art driving control motor 81 has a motor rear cover 811, a driving control circuit board 812, a driving switch 813, a detector circuit board 815, a stator 816, a rotor magnet 817, a rotor cylinder 818, a rotor spindle 819, a rotor bearing 820, a rotor cylinder base 821 and a rotor casing 822. The rotor and rotary shaft have structure like an umbrella. The front and rear supporting bearings of the rotor are installed at the center cylinder of the casing seat of the motor. The rotor is opened and thus is engaged with the bearing through the rotary shaft. The concentricity of the rotor in the manufacturing process and the stability in the amateur effect are bad, especially, in a condition of dramatic oscillation (for example, in an electromotive car), the concentricity of the rotor is easy to deform. Moreover, the driving control circuit board is installed in the motor rear cover with the motor stator. In this structure, the motor driving control circuit is easily interfered by the excited electric wave from the amateur effect of the stator.

Since conventionally, the motor and the driving control circuit are made separately, in some conditions, the installation and operation are inconvenient. Therefore, it is necessary to combine the two devices. However, the current combined structure has still the following disadvantages:

1. The motor driving control circuit is easily interfered by the excited electric wave from the amateur effect of the stator.

2. The supporting strength of the umbrella portion of the rotor of the motor is insufficient, the concentricity in rotation can not be well controlled. Therefore, when a strong excited effect is applied, the stability of the motor is not preferred.

3. The combination of the motor stator and the driving control circuit is not smooth, and thus the manufacturing efficiency can not be well controlled.

4. The winding opening of the stator teeth is too wide, the excited effect of the motor is greatly reduced so that the operation efficiency of the motor is affected. Meanwhile, the Cogging torque disadvantageous to the motor is increased.

SUMMARY OF THE INVENTION

Accordingly, the primary object of the present invention is to provide a motor hiding with a driving control circuit. The conventional motor and driving circuit are combined.

At first, the driving circuit is installed at the driving control circuit box at the rear side of the rear motor cover, and an outer end surface serves to isolate excited coil.

Secondary: the motor stator excited coil is installed with an excited coil connecting plate for being connected with the coil completely. Then, the input and output signal ends and the detecting control ends passes through the through holes of the rear motor cover of the motor insulatedly, and is conductive to the circuit board of the driving control circuit for signal transformation.

Third: A lower momentum rotor having a hollow cylinder. Two panels at two ends serve to cover the two ends of the cylinder. The centers of the front and rear end panels are aligned for being tightly engaged with the motor spindle. The front and rear bearings of the rotor are further inserted through the front and rear ends of the spindles to stop at front and rear end panels. The front and rear bearings are fixed to the bearing seats of the front and rear motor covers so that the rotor of the motor is steadily supported so as to assure the stability of the operation of the motor.

The various objects and advantages of the present invention will be more readily understood from the following detailed description when reading in conjunction with the appended drawing.

DETAILED DESCRIPTION OF THE PREFERRED EMBODIMENTS

Figure 1:
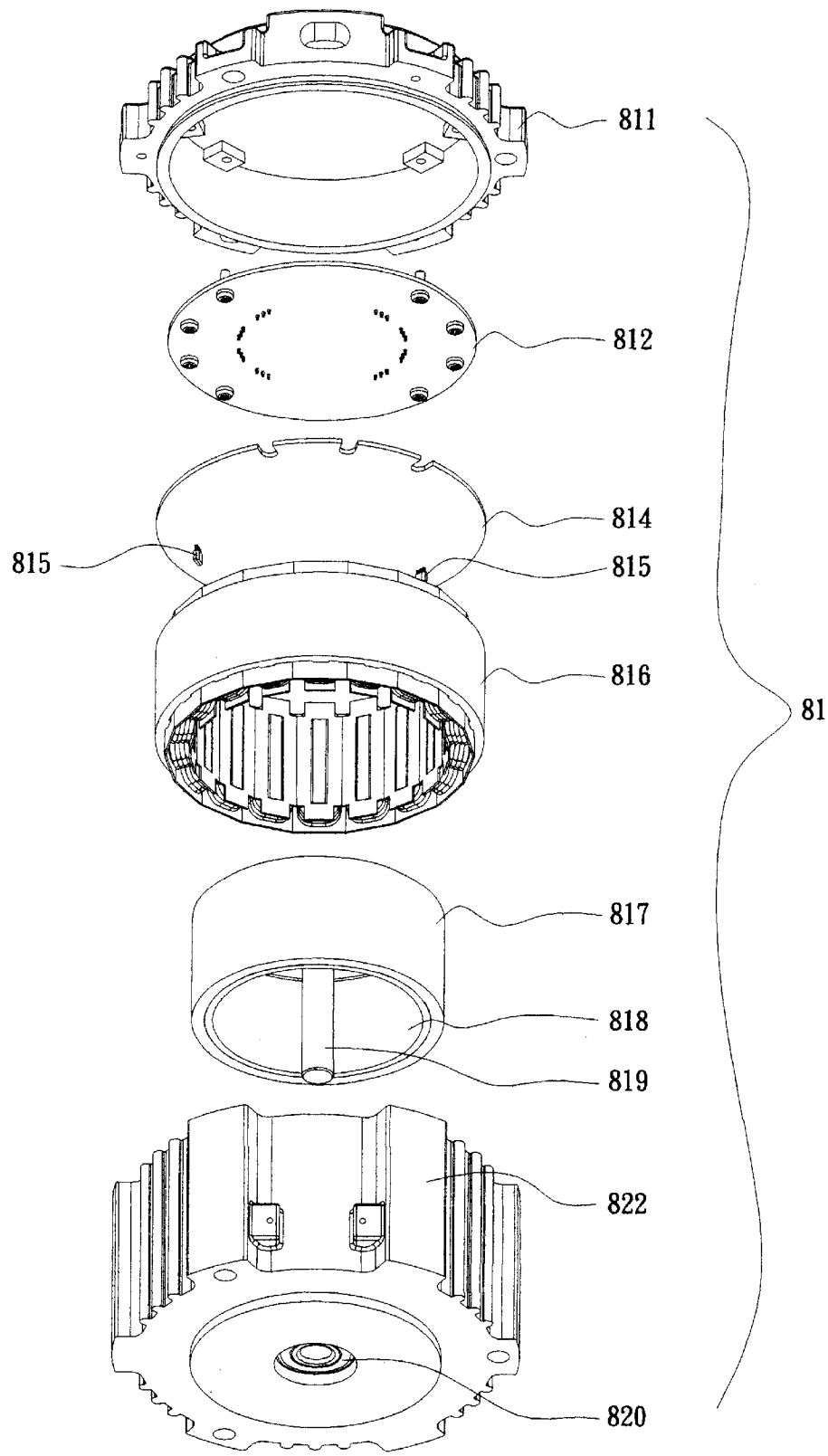
FIG. 1 is a schematic view of a prior art driving controlling motor.
Figure 2:
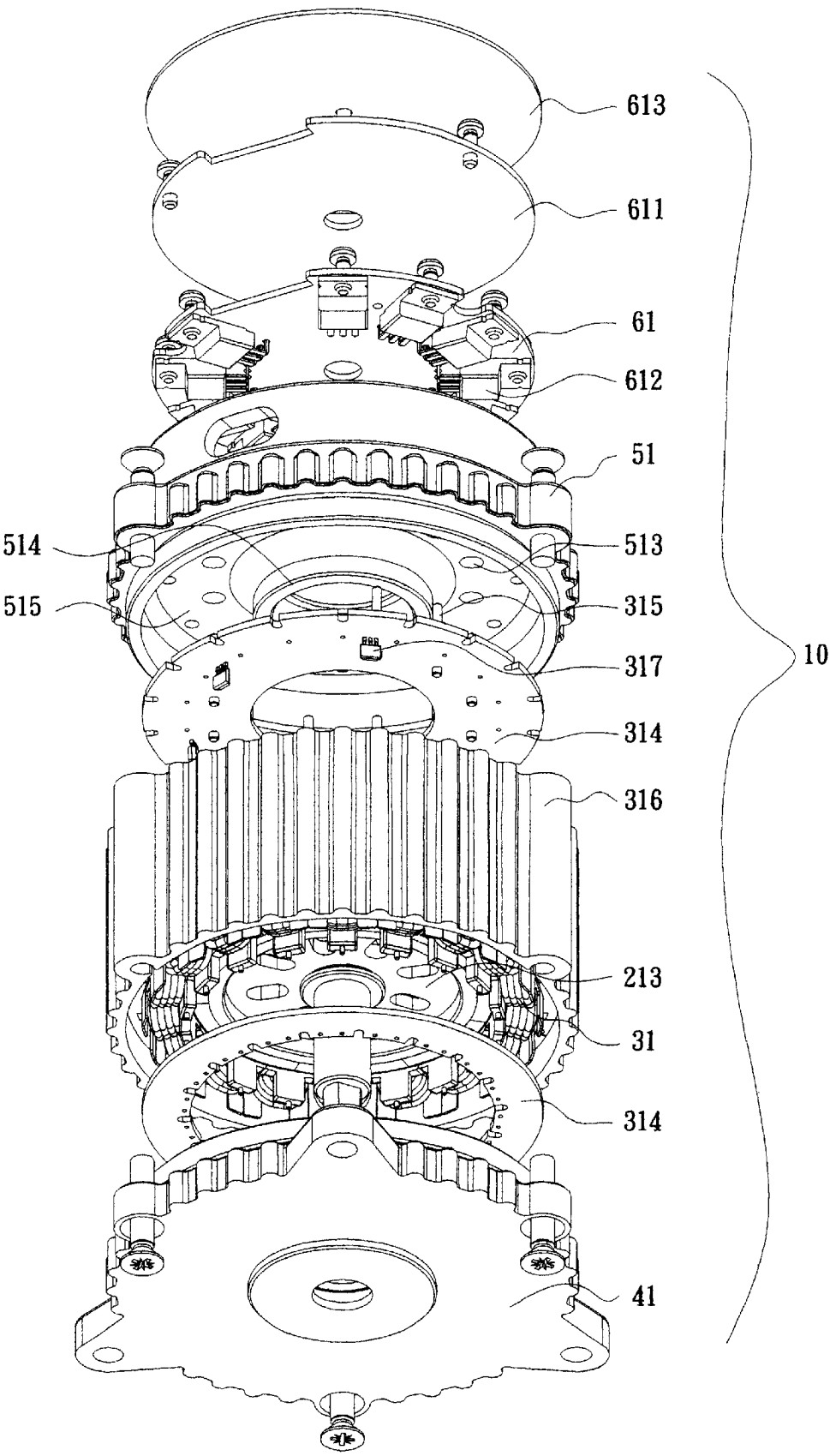
FIG. 2 is a schematic view of the present invention.
Figure 3A:
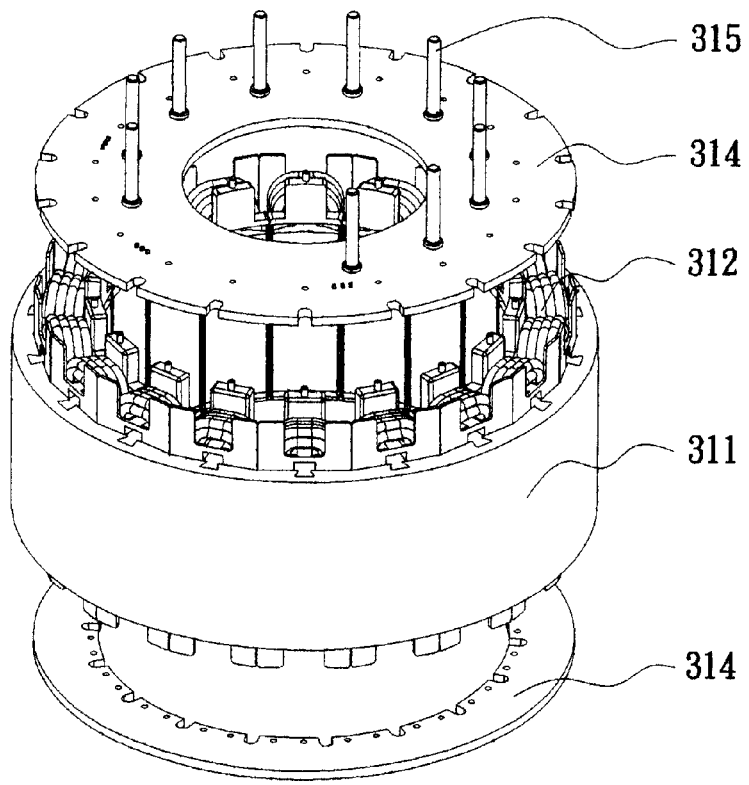
FIGS. 3A and 3B shows the assembly of the stator signal connecting plate and the signal guide pins in the present invention.
Figure 3B:
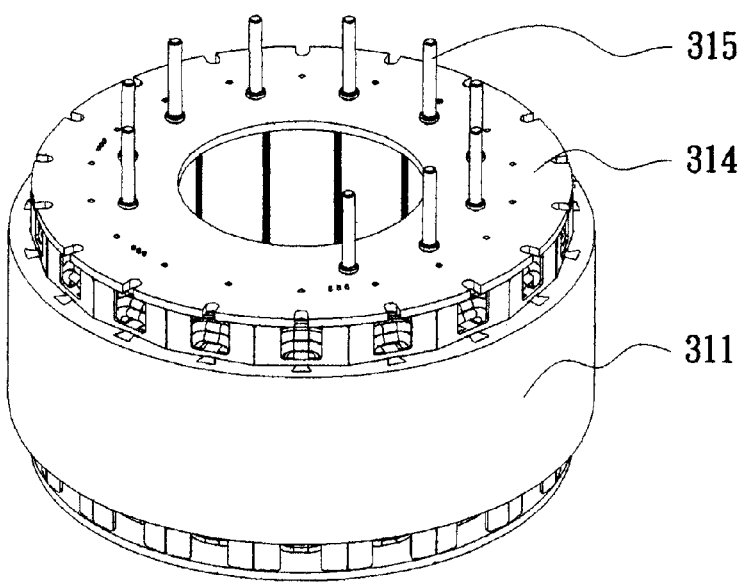
Figure 4:
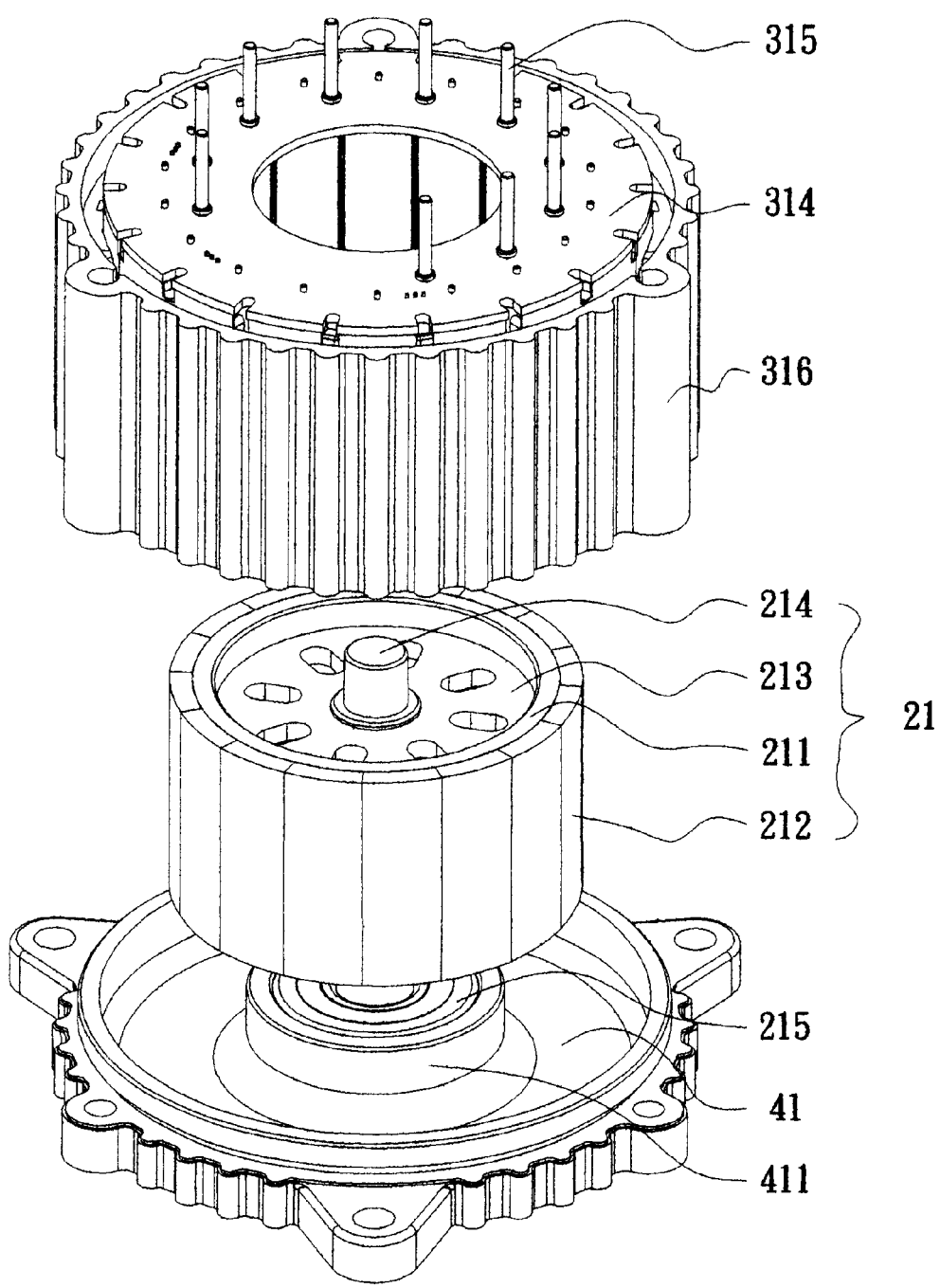
FIG. 4 is an assembly view showing assembly of the stator casing, low momentum rotor and front motor cover.
Figure 5:
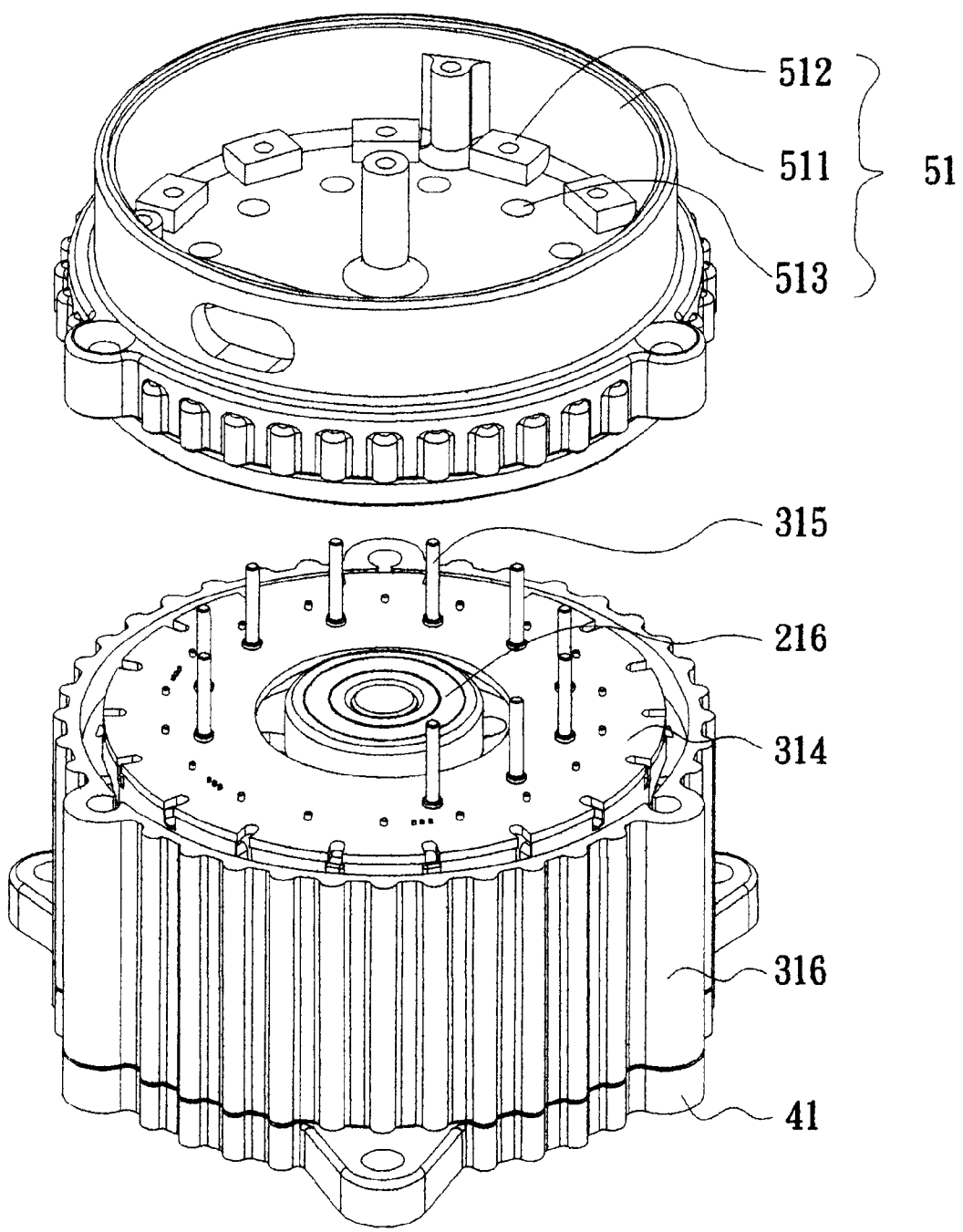
FIG. 5 is an assembly view of the stator casing and the motor rear motor cover.
Figure 6:
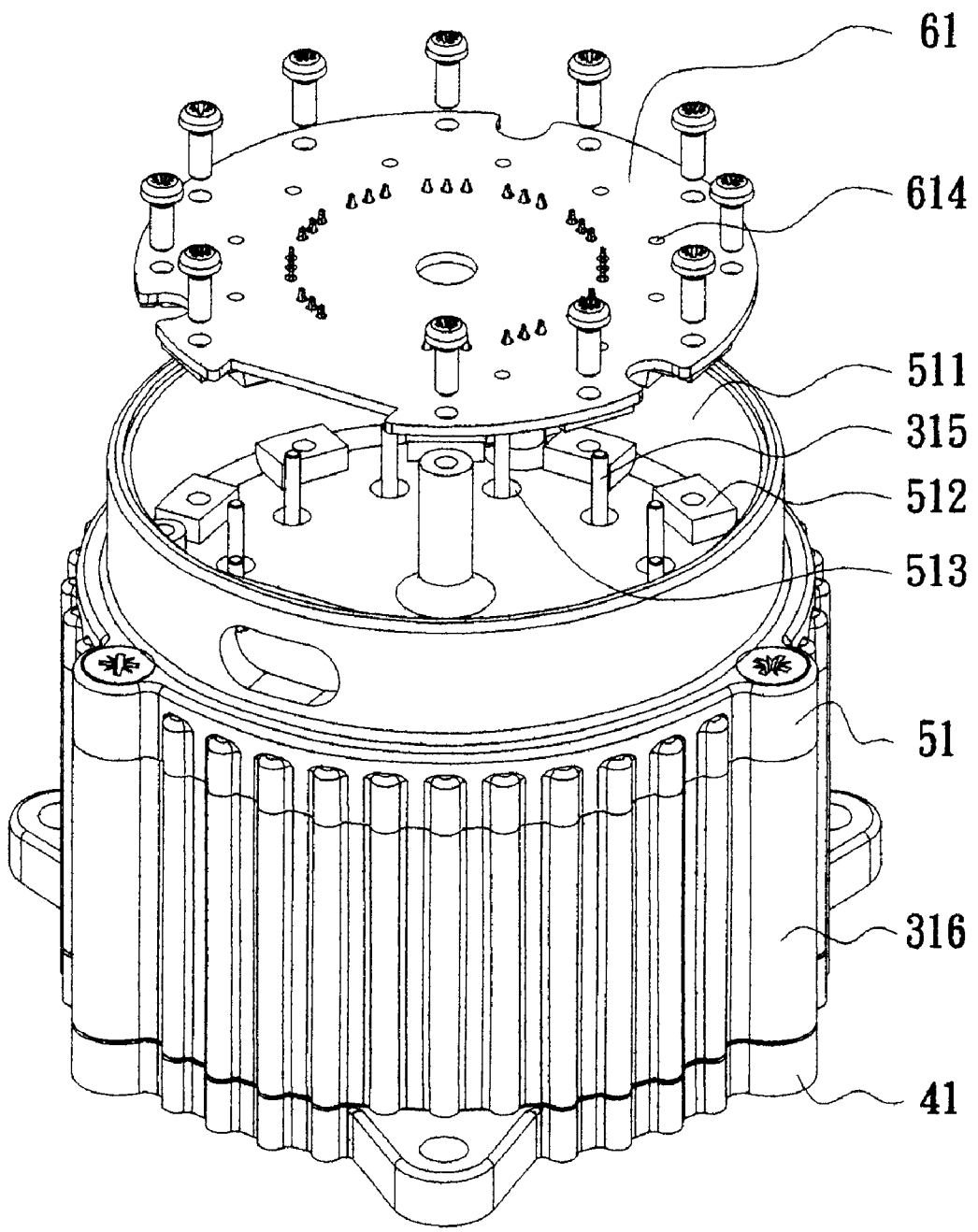
FIG. 6 is an assembly view of the driving control board and the signal guide pin.
Figure 7:
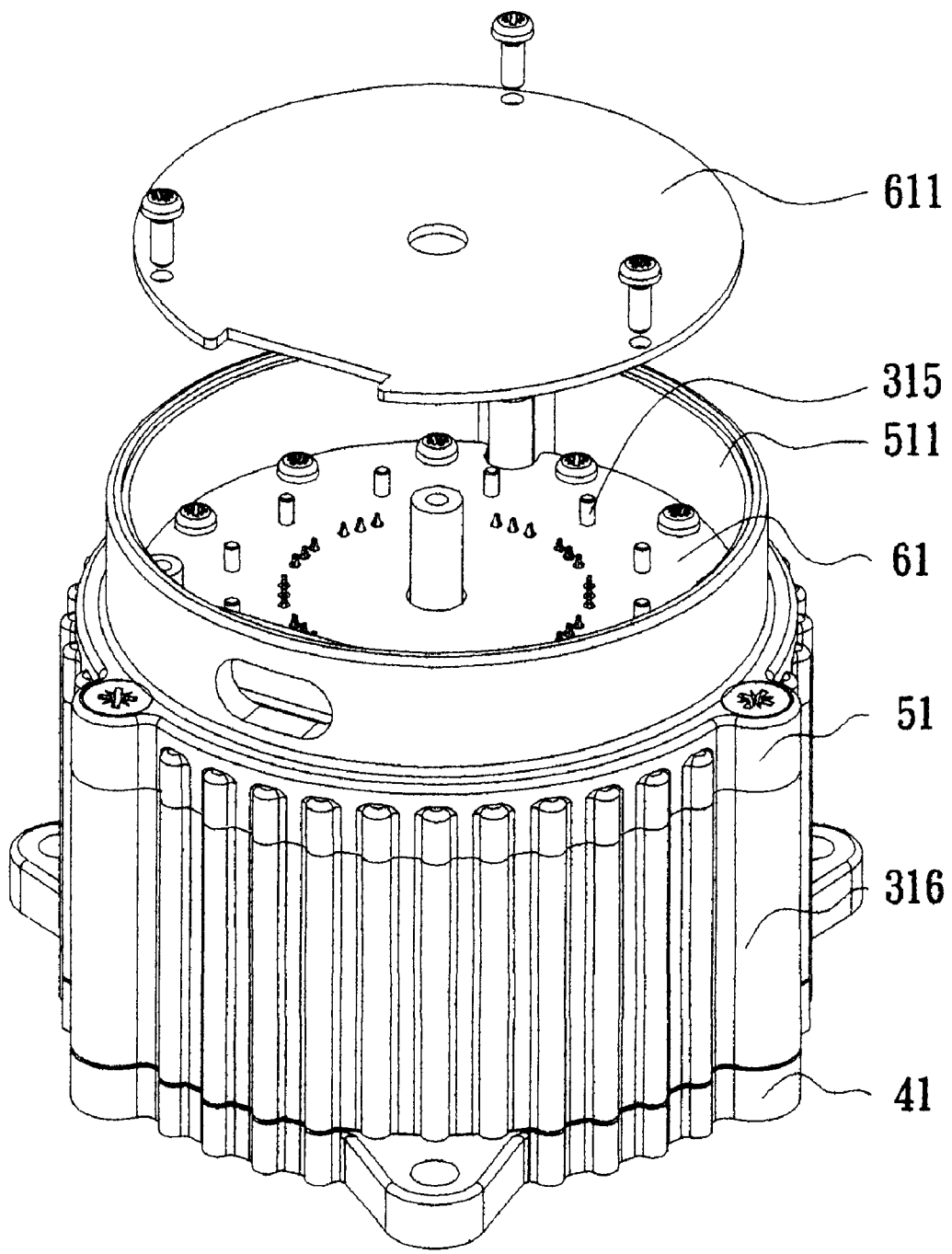
FIG. 7 is an assembly view of the driving control auxiliary circuit board and the signal guide pins of the present invention.
Figure 8A:
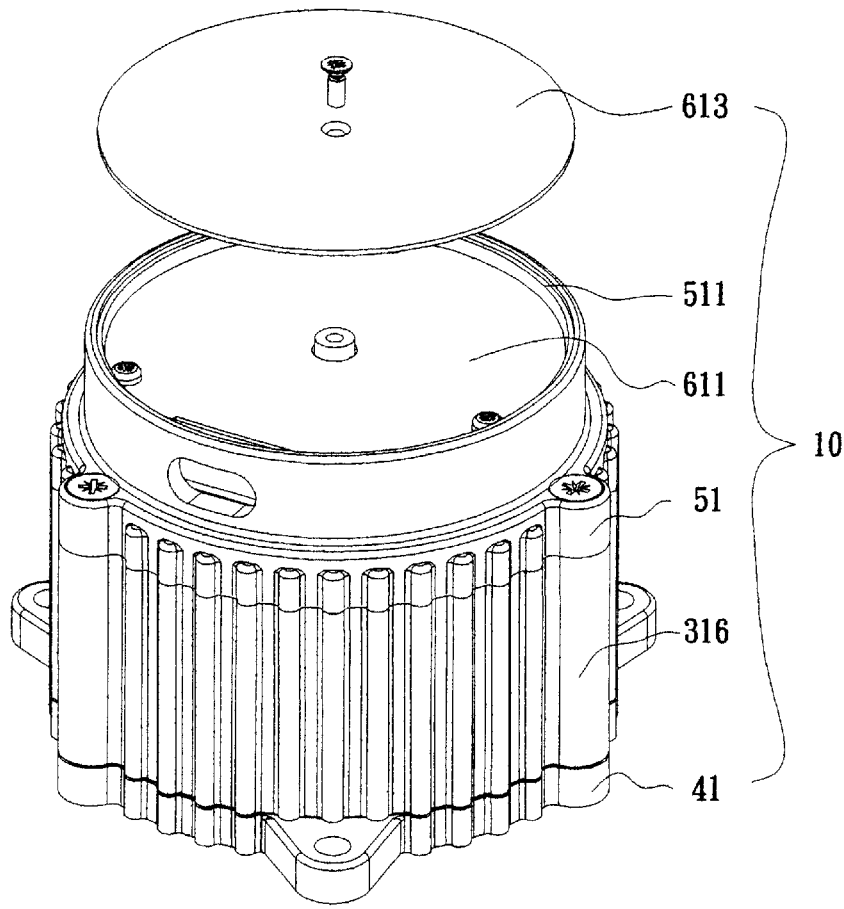
FIGS. 8A and 8B are an assembly view of the cover plate of the driving control circuit board in the present invention.
Figure 8B:
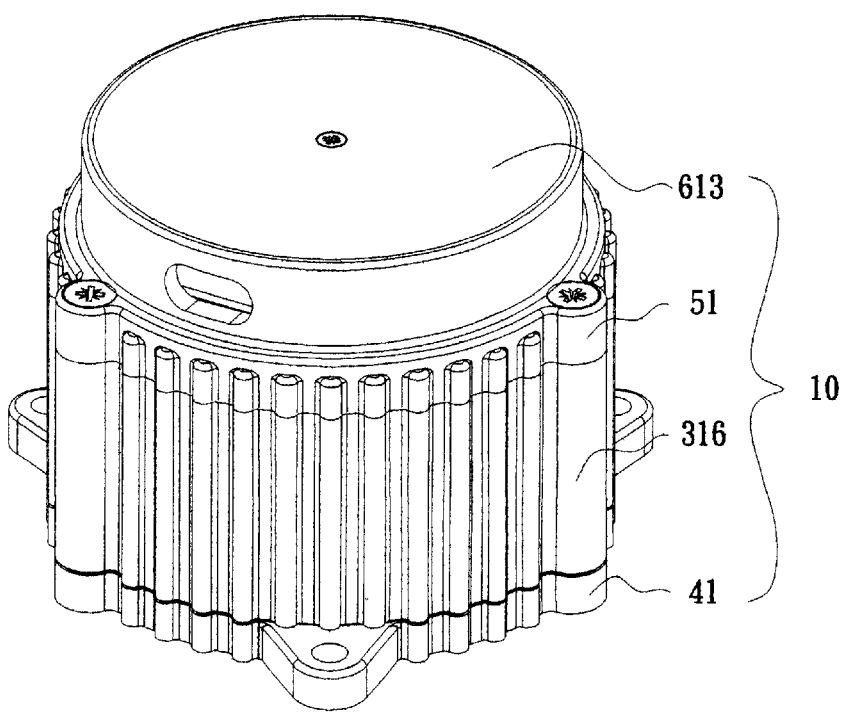

Referring to FIG. 2 to FIGS. 8A and 8B, the motor structure 10 hiding with a driving control circuit of the present invention is illustrated. The present invention includes a rear motor cover 51 made by casting, a front end surface thereof is disposed with a bearing seat 514 and a rotor spindle 214 is provided for supporting a rear bearing 216.

The driving control circuit box 511 is a box protruded from the rear end surface of the rear motor cover 51. The box serves to receive a driving control circuit board 61. The lower side of driving control circuit board 61 has an auxiliary control circuit board 611 and a covering plate 613. The lower end surface of the box 511 provides with a plurality of driving switch seats 512 for locking the driving switch 612 and for heat dissipating. The lower end surface of the box 511 is penetrating by a plurality of pin through holes 513 for being penetrated by the signal guide pins 315.

The excited coil connecting plate 314 is formed by a circuit board for welding and thus being conductive by the excited coils stator 31 and the plate 314. The stator portion 316 has a stator ring portion 311, a stator coil insulating seat 312 and a stator casing 316, etc. The input and output ends of the plurality of excited coil and the detecting ends of the excited coil are conductive through the plurality of signal guide pins 315, and the plurality of signal guide pins 315 are insulated and penetrated through the plurality of pin through holes of the motor cover 51 and are welded to and thus conductive with the respective signal guide pins 614 of the driving control circuit board 61.

The lower momentum rotor 21 has a hollow cylinder 211. Two panels 213 at two ends serve o cover the two ends of the cylinder 211. Rotor magnets 212 are fixed out of the cylinder 211. The center of the panels 213 are formed with aligned holes so that the rotor spindle 214 may be tightly engaged in the holes, enhancing the support of the rotor and reducing the weight of the rotor. Thus, the rotary momentum of the motor rotor is reduced.

The front and rear bearings 215 and 216 of the rotor are tightly engaged in the two ends of the rotor spindle 214 and resists against the front and rear end panel 213. The rear bearing 216 of the rotor is received in the bearing seat 514 of the rear motor cover 51; and the front rotor bearing 215 is received in a bearing seat 411 of a front motor cover 41.

The front motor cover 41 is formed by casting. A rear end surface thereof is formed with a bearing seat 411 and serves to be engaged and support with the rotor front bearing 215; the rotor spindle 214 of the motor passes through a front end surface of the front motor cover 41 for outputting the twisting force of the motor.

The driving control circuit of the present invention is installed within the driving control circuit box 511 at a rear side of the rear motor cover 51, and the outer end surface 515 of the bearing seat 514 serves to isolate excited electromagnetic wave. The motor stator excited coil is installed with an excited coil connecting plate 314 for being connected with the coil completely. Then, the input and output signal ends and the detecting control ends pass through the through holes 513 of the rear motor cover 51 of the motor insulatedly, and are conductive to the circuit board 61 of the driving control circuit for signal transformation. The front and rear ends of the cylinder 211 of the lower momentum rotor 21 are sealed by the end panels 213. The centers of the front and rear end panels 213 are aligned for being tightly engaged with the motor spindle 214. The front and rear bearings 215 and 216 of the rotor 21 are further inserted through the front and rear ends of the spindles 214 to stop at front and rear end panels 213. The front and rear bearings 215 and 216 are fixed to the bearing seats 411 and 514 of the front and rear motor covers 41 and 51 so that the rotor 21 of the motor is steadily supported to assure the stability of the operation of the motor.

In the motor structure hiding with a driving control circuit of the present invention, one end of the hollow cylinder 211 in the lower momentum rotor 21 is integrally formed with one end panel 213. Another opening of the hollow cylinder 211 is engaged with another panel 213.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A motor hiding with a driving control circuit comprising:
   a rear motor cover made by casting, a front end surface thereof being disposed with a bearing seat and a rotor spindle being provided for supporting a rear bearing;
   a driving control circuit box being a box protruded from a rear end surface of the rear motor cover; the box serving to receive a driving control circuit board; a lower end surface of the box providing with a plurality of driving switch seats for locking a driving switch and for heat dissipating; a lower end surface of the box being penetrated by a plurality of pin through holes for being penetrated by a plurality of signal guide pins;
   an excited coil connecting plate being formed by a circuit board for welding and thus being conductive by excited coils of a stator and the excited coil connecting plate; an input and an output end of each excited coil connecting plate and detecting ends of the excited coils being conductive with the plurality of signal guide pins, and the plurality of signal guide pins being insulated and penetrated through the plurality of pin through holes of the motor cover and being welded to and thus conductive with the respective signal guide pins of a driving control circuit board of the driving control circuit box;
   a front motor cover being formed by casting mold; a rear end surface thereof being formed with a bearing seat and serving to be engaged and support with the rotor front bearing; the rotor spindle of the motor passing through a front end surface of the front motor cover for outputting a twisting force of the motor; and
   a front bearing and rear bearing of the rotor being tightly engaged in the two ends of the rotor spindle and resisting against the front and rear end of the rotor; a rear bearing of the rotor being received in the bearing seat of the rear motor cover; and a front rotor bearing being received in a bearing seat of a front motor cover.

2. The motor hiding with a driving control circuit as claimed in claim 1, further comprising a lower momentum rotor having a hollow cylinder; two panels at two ends serving to cover the two ends of the cylinder, centers of the panels are aligned so that the rotor spindle is tightly engaged, and thus the supporting of the rotor is enhanced and a weight of the rotor is reduced, and therefore, the rotary momentum of the motor rotor is reduced.

3. The motor hiding with a driving control circuit as claimed in claim 1, wherein the hollow cylinder of the lower momentum rotor has an end being integrally formed with one of the panels, another opening end of the hollow cylinder is engaged with another end of the other panel.

* * * * *